March 21, 1967     M. E. VAUGHAN     3,310,623

EXTENSION CORD STORAGE MEANS

Filed June 30, 1965

INVENTOR.
MARION E. VAUGHAN
BY Harry R. Lubcke
AGENT

United States Patent Office 3,310,623
Patented Mar. 21, 1967

3,310,623
EXTENSION CORD STORAGE MEANS
Marion E. Vaughan, Los Angeles, Calif.
(205 N. Segovia Ave., San Gabriel, Calif. 91775)
Filed June 30, 1965, Ser. No. 468,510
4 Claims. (Cl. 174—135)

This invention relates to means for storing electrical extension cords, and more particularly to such means as to compact the cord into a relatively small and firm bundle, which may then be easily handled.

Electrical extension cords are widely used in households, offices and in industry. One of the advantages of such cords is for temporary use in extending electrical service away from wall outlets, to power some kind of electrical device located within the room. When the set-up is no longer required and the cord is disconnected, the matter of how and where to store the cord until the next use becomes a problem. Merely throwing the extension cord in a drawer, cabinet, or other enclosure soon results in a tangle with other cords or articles. Should a coil be formed of the cord, a means for tying the coil is required, preferably at two or three places, or else it rapidly becomes uncoiled. Even with a cord tied into a coil, the turns thereof often become snarled with other articles and the turns may become both longer and shorter than originally coiled, converting it into an awkward item to handle.

It is therefore an object of this invention to provide an essentially tubular means for storing an extension cord, whereby the cord is formed into a relatively small and firm bundle and this shape is retained by insertion of the cord into the tube.

Another object is to provide a novel cross-section of such a tubular holder, which is particularly suited to accommodate a long or a short cord.

Another object is to provide such a holder that is simple, durable, decorative and inexpensive.

Another object is to provide such a holder into which the cord can be quickly and easily inserted.

Other objects will become apparent upon reading the following detailed specification and upon examining the accompanying drawings; in which is set forth, by way of example and illustration, an embodiment of the invention.

Figure 1:
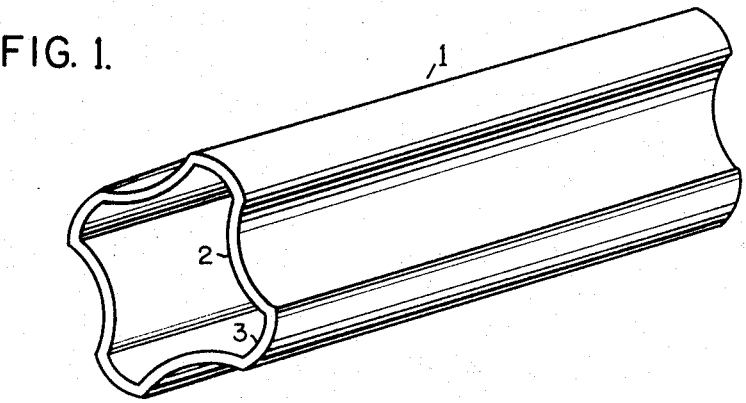
FIG. 1 shows a perspective view of the tubular holder.

In FIG. 1, holder 1 is formed of a length of tubing having a cross-section of more or less "pincushion" shape. The cross-section of the tubing is essentially square, with, however, concave sides 2 and rounded corners 3. The reason for this shape will be seen in the following discussion of the other figures.

Figure 2:
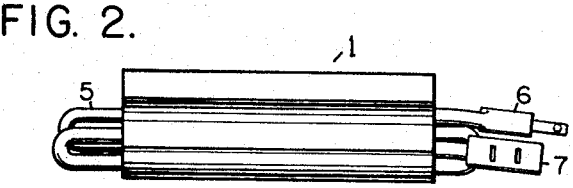
FIG. 2 is a side elevation of the same with an extension cord disposed therein.

In FIG. 2, an extension cord 5 is shown doubled back and forth within tube 1. Plug 6, which enters the usual wall electrical outlet when the cord is in use, and socket fitting 7 are shown both at the same end of the holder. This is the preferred manner of placing the cord within the holder. The user winds the extension cord into a coil, flattens the coil, and thrusts the end devoid of plug and socket into tube 1 until the forward end projects from the tube.

Figure 3:
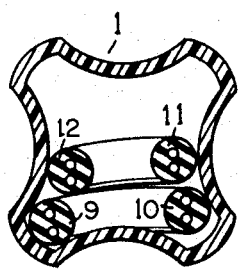
FIG. 3 is a sectional view of the relation between a short extension cord and the holder.

In FIG. 3 a short extension cord is shown in section within holder 1. Only four convolutions, for example, are shown. These are numbered 9, 10, 11 and 12, for identification. It is seen how the concave sides 2 of the tubing retain the convolutions, even though there is excess space across the cross-section as a whole. The thrusting of the cord into the tube may be haphazard; an equivalent configuration will always occur.

Figure 4:
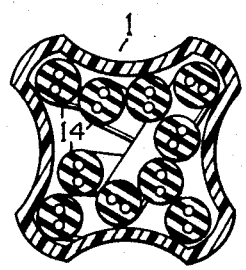
FIG. 4 is a sectional view of the relation between a long extension cord and the holder.

In FIG. 4 a long extension cord is shown within holder 1, with ten convolutions identified as 14 all within the same cross-section. It is seen how that with a number of convolutions the same are automatically forced into the rounded corners of the tubing as the cord is placed within the tubing. This is an unexpected and desirable functioning of the one static element in holding extension cords of different length.

The tubing 1 of FIG. 1 is easily manufactured by extruding any of a relatively wide variety of plastics, to use a generic term. The requirements for the tube are that it should not be brittle nor extremely flexible, that it should be moderately tough and strong, and that it should be inexpensive and present a pleasing appearance.

Certain materials are to be preferred, such as acrylonitrile-butadiene-styrene, "ABS"; cellulose acetate butyrate, "CAB"; or polyvinyl chloride, "PVC." Economy may be gained by employing less than the highest quality ingredients in compounding the plastics, since the mechanical requirements for the holder according to this invention are moderate and chemical resistance or extreme temperatures are not involved. These materials can be fabricated in essentially all colors, so that the color of any household decor can be accommodated.

It will be understood that the length and cross-sectional dimensions of tube 1 may be varied over considerable ranges in order to accommodate large and long cords as a class, or small and short cords as a class. The former may include industrial and communications industry cords, including television and sound cables, while the latter normally includes those cords employed around home or office. For the usual home cord eight feet long, tubing 1 may be five inches long by approximately two and one-half inches for the diagonal between diagonally opposite corners. This brings the nearest parts of opposite concave sides to within less than two inches of each other.

The thickness of the wall of tube 1 is subject to similar variation, depending upon the over-all size of the holder and any secondary reasons to which it will be influenced in use. However, for home use a thickness of one-eighth inch is typical.

The basic embodiment of this invention calls for a tube 1 that is essentially rigid. However, an alternate embodiment is possible in which the tube is slightly flexible, in which state it tends to accommodate the individual convolutions of the extension cord in an easier manner. It is also possible that rather than the straight tubular form, the form may have a gradual curve for better sales appeal to the homemaker.

It will be understood that extension cords may be sold within a holder according to this invention in stores. This prevents serious kinking of the cord at one end after it is unwound, as results from the present configuration in which extension cords are sold, and also immediately exhibits the manner of use and convenience of the holder of this invention.

Other modifications may be made in the size, proportions and shape of the device without departing from the scope of this invention.

Having thus fully described the invention and the manner in which it is to be practiced, I claim:

1. A device for storing an electrical extension cord comprising;
   a hollow tube,
   said tube having a substantially uniform cross-section throughout its length,
   said cross-section being substantially square, but having concave sides and rounded corners;
   whereby convolutions of a short extension cord are restrained within said tube by said concave sides, while a great number of convolutions of a long extension cord are additionally retained within all of said rounded corners.

2. The device of claim 1 in which;
the cross-section of said tube is essentially that of a pincushion having rounded corners such as to each accept only one said convolution of said cord.

3. The device of claim 1 in which;
the ratio of length to diagonal cross-section of said tube is of the order of two to one, and
the ratio of length to cross-section between said concave sides is of the order of three to one.

4. The device of claim 1 in which;
the material of said tube is an essentially rigid plastic of essentially uniform wall thickness.

References Cited by the Examiner

UNITED STATES PATENTS

| 910,192 | 1/1909 | Grouvelle et al. | 138—44 |
| 1,801,451 | 4/1931 | Parker | 138—112 |

FOREIGN PATENTS

| 647,389 | 7/1928 | France. |

LEWIS H. MYERS, *Primary Examiner.*

H. HUBERFELD, *Assistant Examiner.*